Jan. 22, 1957 S. ÖBERG 2,779,019
NAVIGATIONAL RADAR REFLECTOR SYSTEMS
Original Filed April 13, 1951 3 Sheets-Sheet 1
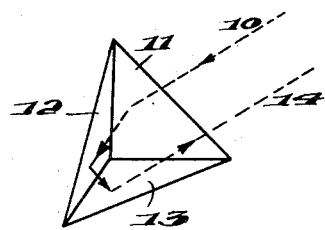
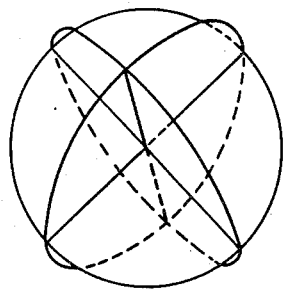
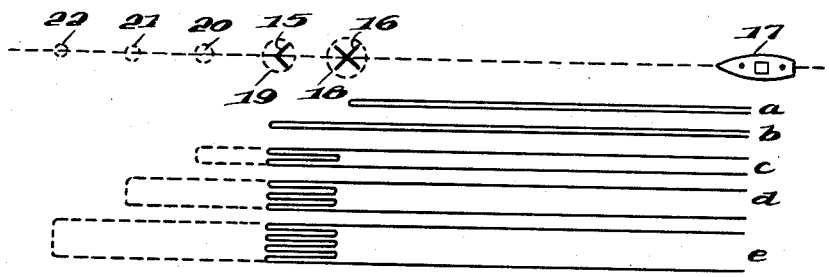
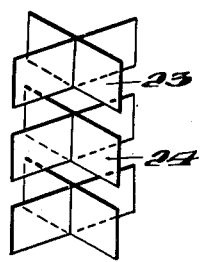
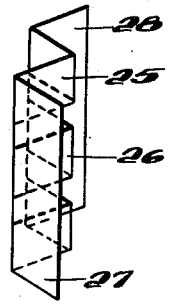
INVENTOR
SVEN OBERG,
BY Robert B Larson
ATTORNEY Jan. 22, 1957  S. ÖBERG  2,779,019
NAVIGATIONAL RADAR REFLECTOR SYSTEMS
Original Filed April 13, 1951  3 Sheets-Sheet 2

INVENTOR
SVEN OBERG,
BY Robert B. [signature]
ATTORNEY

Jan. 22, 1957　　　　　　　S. ÖBERG　　　　　　2,779,019
NAVIGATIONAL RADAR REFLECTOR SYSTEMS
Original Filed April 13, 1951　　　　　　　3 Sheets-Sheet 3

INVENTOR
SVEN OBERG,

BY Robert B. Larson
ATTORNEY

United States Patent Office 2,779,019
Patented Jan. 22, 1957

2,779,019
NAVIGATIONAL RADAR REFLECTOR SYSTEMS

Sven Öberg, Stockholm, Sweden, assignor to Svenska Aktiebolaget Gasaccumulator, Stockholm-Lidingö, Sweden, a company Original application April 13, 1951, Serial No. 220,757. Divided and this application October 11, 1954, Serial No. 461,585

3 Claims. (Cl. 343—18)

This application is a division of my co-pending application Serial No. 220,757 filed April 13, 1951.

This invention relates to navigation devices and more particularly to devices by which the position of objects can be located through the use of radar.

According to the broad principle of radar, a pulsed signal of a very high frequency is transmitted by a rotating antenna so as to scan the area adjacent the transmitter. Objects in the area will reflect the signal back to the transmitter to give an indication of the presence of the object. The reflected beam is directed to a cathode ray oscilloscope whose electron beam is constantly sweeping the scope in synchronism with the movement of the antenna. The intensity of the electron beam is influenced by the reflected radar wave, so that, for example, the electron beam is fully or partly suppressed when no reflected beam is received but obtains full intensity when a reflected beam is received.

Thus, the oscilloscope will indicate the position of the objects causing the reflection of the input of the radar beam.

The angular position on the screen will be determined by the angular position of the transmitter antenna. The indication on the screen of the distance of the object from the transmitter will be dependent upon the time required for the signal to be transmitted to the object and then reflected back to the transmitter.

The principles outlined above have been utilized as navigational aids for airplanes, ships and the like. One arrangement proposed involves the use of so-called radar reflectors. Such a reflector in its simplest form may consist of a metal disk for reflecting a radar beam as described above. As a rule the disk is not completely satisfactory because only in exceptional cases will it reflect a beam back to the transmitter. A better solution of the reflector problem is obtained by arranging two reflector plates at an angle to each other, and one of the best solutions consists in the arrangement of three reflector plates built together as a pyramid. These reflectors will function in the same way as the total reflecting pyramid known in the optical art.

These reflector arrangements, however, have the disadvantage that they will cause only a single point to be received on the oscilloscope screen and the single point is difficult to separate and distinguish from other points inadvertently received on the screen. Nor has it been possible with such known arrangements for the operator to identify the particular reflector being observed.

It is the object of the present invention to provide a reflector arrangement by which the operator can easily distinguish the reflector being observed from random spots on the radar screen, and further to provide a code by which each reflector can be identified by the operator.

This and other objects are accomplished by a reflector system which operates entirely on signals reflected from objects constructed and arranged according to the present invention.

The invention is further described in connection with the attached drawings in which:

Figs. 1 and 2 indicate the general principle of the pyramidic radar reflector,

Fig. 3 is a diagrammatic view of a reflector arrangement illustrating the principle of the invention.

Figs. 4a and 4b are diagrammatic perspective views of reflectors which may be used in the arrangement of Fig. 3.

Figure 5:
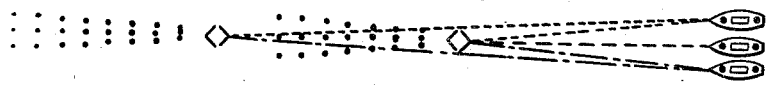
Fig. 5 is a diagrammatic view of a modification of the arrangement of Fig. 3.

Fig. 1 shows a known radar reflector which operates according to the pyramidic principle. The reflector is constructed from three reflector screens 11, 12 and 13 connected together as sides of a pyramid with the angular relationship of the sides so designed that an input signal wave will always be reflected backwards in its own input direction. The angular relationships are known from the optical total reflecting pyramid. Thus, for instance, the beam 10 is first reflected against the side 11, thereafter against side 12 and finally against side 13. Thereafter, the beam returns in its own initial direction as beam 14.

Fig. 2 shows an arrangement consisting in eight reflectors of the type shown in Fig. 1 mounted together to a spherical body. This arrangement has proved to be very effective even for marine navigation purposes in which the two vertically directed pyramid openings are not effective.

In the arrangement shown in Figs. 1 and 2, the input wave will be reflected back in the direction from which it originated regardless of its angle of approach to the reflector. When the wave comes in at an angle to all three sides, the reflection will take place from all three surfaces. On the other hand, if the input beam is parallel to one of the sides, only two reflections, from the remaining two sides, will be necessary to return the beam back to its source. Therefore, if it is known in advance that the input signal will always be in the horizontal direction, it will be necessary to construct the reflector of only two screens having their planes extending in the vertical direction. The invention will be described in connection with such a reflector although it is to be understood that the invention may be used equally well with the total reflecting pyramid. In order to simplify the description still further, the disclosure will deal primarily with the navigation of ships, although it is further to be understood that the invention may be applied equally well to the navigation of aircraft and the like.

In all of the embodiments shown and described, it will be assumed that the reflector is mounted on solid ground so that it may have a predetermined fixed position and that the radar beam from the vessel strikes the reflector horizontally. If these conditions cannot be satisfied, one skilled in the art can modify the arrangement to suit the particular need.

The principle of the invention is illustrated in Fig. 3. Two reflectors 15 and 16 are placed in fixed positions on two low rocks in an island group for example. The reflector 15 is a simple angular reflector consisting of two screens of the type referred to above. The reflector 16 is a combination of two such angular reflectors one directed toward reflector 15 and the other directed away from reflector 15. Further, reflector 16 is constructed so that a part of the radar beam will be reflected back to the source whereas the remaining part of the beam will pass beyond reflector 16 and will strike reflector 15.

It is assumed, for the purpose of describing this arrangement that a vessel 17 is transmitting a radar pulse which will be reflected by reflectors 15 and 16 back to the vessel so that the position of the reflectors can be indicated on the radar scope.

The transmitted pulse is first reflected directly back to the vessel by the half of reflector 16 facing the vessel 17. The returning beam will create a picture on the radar scope indicating the place 18 in Fig. 3. Diagrammatically, this pulse propagation has been indicated at $a$.

A part of the wave passes through reflector 16 and strikes reflector 15 and returns to the vessel giving an indication of the position 19. The pulse propagation is indicated diagrammatically at $b$.

The part of the wave energy reflected by reflector 15, however, will hit the half of reflector 16 facing away from the vessel so that it is again reflected to the reflector 15 and then back to the vessel. The wave propagation is indicated at $c$ but because of the longer propagation time the radar scope will appear to show a third position 20 indicating a propagation line illustrated by the dotted line at $c$. The indication is similar to the indication which would be obtained if a reflector had been placed at the position 20.

In this way, by repeated reflection of "imaging" a series of virtual reflector pictures are created on the radar scope. Two further such virtual reflector images have been indicated at 21 and 22 in Fig. 3 with the propagation diagrams at $d$ and $e$, respectively.

Due to the loss of energy in the reflections, the virtual reflector images will be weaker as they are more remote in order until finally no more virtual images are visible. However, enough virtual images will appear so as to form a limited band of dots by which the position of reflector 16, for example, can very easily be determined and distinguished from random reflections which may appear on the radar scope.

As indicated above, it is important that reflector 16 does not fully shadow reflector 15 for then reflector 15 would be ineffective. Suitable reflector constructions which may be used for this purpose are shown in Figs. 4a and 4b. In the embodiment shown in Fig. 4a the reflector is formed by screens which are arranged in the form of an X and located in laminae vertically above each other. In the embodiment according to Fig. 4b the screens are arranged in the form of a W and positioned vertically with respect to each other. In both cases spaces are left between each X-formed or W-formed reflector so as to permit part of the transmitted beam to pass through the reflector.

Theoretically, it would appear that if the input beam were completely horizontal, no repeated reflections would take place since the wave passing through the space between two reflector laminae would be reflected by reflector 15 in such a direction that it would again pass out through the same space without striking the reverse side of reflector 16. However, this does not occur in reality because, upon passing the reflector 16, the wave disperses or deviates to give the wave a slightly vertical component. Further, some spreading of the radiation is obtained at the reflection in each reflector and thus also in reflector 15. This dispersion and spreading have in practical tests proved to be fully sufficient for providing the repeated virtual reflection images.

The reflector according to Fig. 4b is constructed so as to be a single unit by joining the outer ends of the laminae such as 25 and 26 by plates 27 and 28. This arrangement makes the reflector very easily transportable and further the construction is of such a kind that a plurality of reflectors may be laid directly upon each other so as to form a tight package which is advantageous during transportation.

In the embodiments shown in Figs. 4a and 4b the penetrability of the wave through reflector 16 is provided by leaving spaces between reflector and screens. Other arrangements may be provided, for instance, by making the reflector of a wire network of suitable mesh width. It is also possible to form a combination of the solid reflector with the wire mesh reflector so as to resemble a reflector according to Fig. 4a or 4b.

The distance between the two reflectors 15 and 16 is also important. With a radar system of normal quality and with usual wave lengths, a dissolution of the images created in the receiver can be obtained by spacing the reflectors for moderate distances such as 50 to 100 metres. If the distance between the reflectors is made less than the critical distance for dissolution, it is obvious that the reproduced images of the real or virtual reflectors will combine themselves into a line. On the other hand, if the distance between reflectors is greater than the critical distance, the images will appear as distinct dots on the radar scope.

A system of the type described in connection with Fig. 3 can be used for indicating long channels. The arrangement for such an indication consists of a plurality of reflector groups spaced along the channel so that they are simultaneously visible on the screen of the radar receiver, thereby indicating a navigation line through the channel. Fig. 5 shows such an arrangement.

In that figure two such reflector groups are shown with the dots indicating the virtual images as they would appear on a radar scope. It is seen from Figure 5 that each reflector will present a series of virtual images which, when seen all together on the radar scope, indicate the channel which is intended to be marked for navigation purposes.

There are certain disadvantages to the arrangement shown in Figs. 3 and 5. For example, it is always necessary that the reflector nearest the transmitting vessel shadow to a certain extent the reflector more remote from the transmitting vessel. The intensity of the reflector system will, therefore, suffer. Further, it is possible that the particular topography will not permit the positioning of reflectors as required in connection with Figs. 3 and 5. For example, it may be necessary to indicate, by means of a reflector system, a small rock in the middle of the water where the reflector 15 is placed. If there is no solid ground on the place where the reflector 16 or 30 should be placed, the system of Figs. 3 and 5 cannot be used.

Figure 6:
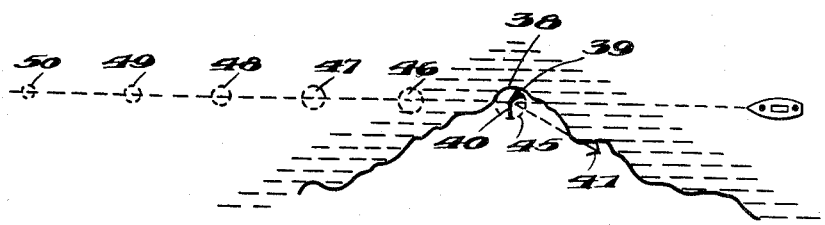
Fig. 6 is a diagrammatic view of a further modification of the arrangement of Fig. 3.

The arrangement of Fig. 6 is designed to improve the degree of reflection of the system and/or to make it possible to arrange the reflector system with regard to varying topographical conditions.

Figure 8:
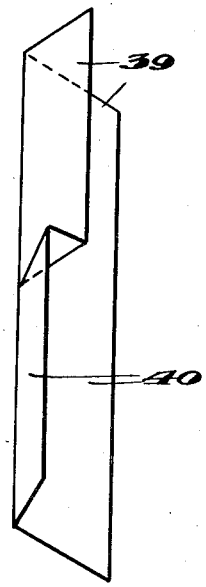

In the arrangement of Fig. 6, it will be assumed that it is desired to mark a dangerous portion of land which juts out into the water as indicated at 38. It will be seen that there is no possibility of locating a reflector at a point which would normally occur at 46. In this case, however, a reflector is located at 39 and a second reflector located at 41. The reflector 39 is illustrated in Fig. 8 and consists of a right angle reflector at the top and immediately below an obtuse or acute angle reflector 40. These reflectors cooperate with the reflector 41 which is of the right angle type.

The radar beam initially will strike the right angle portion of reflector 39 and be reflected back to the vessel giving an indication of the position of that reflector at 45. The beam will also strike the obtuse or acute angle reflector 40 and be reflected to the reflector 41, back to the reflector 40 and to the vessels. In this way, the virtual image 46 will be created.

Part of the beam sent back from the angular reflector 41, however, will not strike the wide angle reflector 40 but will strike the right angle portion of reflector 39. This beam will again be reflected in the direction of the reflector 41 and back to the reflector 40 and to the vessel. Thus, by repeated reflections between reflector 39 and 41 and ultimately the wide angle reflector 40, a series of virtual images 47, 49, 50 and so on will be created on the radar scope.

Figure 7:
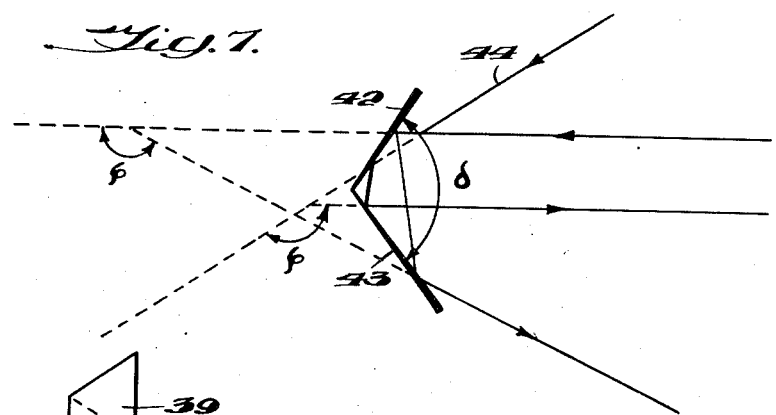
Figs. 7 and 8 are diagrammatic views illustrating the reflector to be used in the system of Fig. 6, and Figs. 9–12 are diagrammatic views of still further modifications of the arrangement of Fig. 3.

The operation of the wide angle reflector 40 can be explained by reference to the schematic diagram in Fig. 7. The reflector is constructed to two reflecting screens 42 and 43. If an input beam has the direction 44, this will first be reflected against the screen 42 and then against screen 43, but because of the wide angle will not be returned in the direction from which is originated. Rather, it will take a direction differing from the input direction by the angle $\phi$.

If the opening angle of the wide angle reflector is $\delta$, it is obvious that the relation between the angle $\phi$ and the angle $\delta$ will be:

$$\delta = 180° - \frac{\phi}{2}$$

In the system according to Fig. 6, the right angle reflector 41 should therefore be placed in the horizontal plane in a direction from the reflectors 38, 39, which is separated from the direction of the input beam by an amount of $180° - \phi$. If the reflector 41 is positioned as described above, then the input beam will be reflected from the wide angle reflector 40 to the reflector 41 and then back toward the reflector 39 or 40 along the original path.

Figure 9:
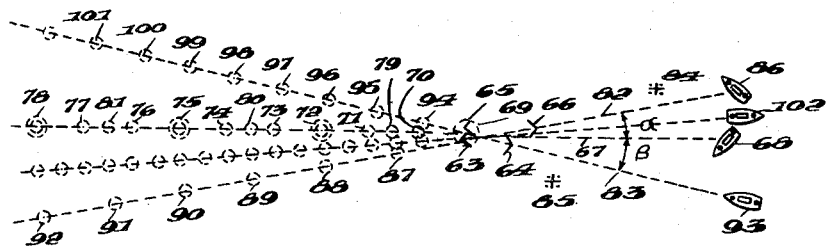

An application of the system described with respect to Fig. 3 is shown in Fig. 9. It is possible by the use of reflector pairs of differing lengths between reflectors to provide a code-like division of the virtual images. In the system of Fig. 9, there are two pairs of normally cooperating reflectors, namely, the reflector pair 63—64 and the reflector pair 65—66. The distance between the reflector 63—64 is different from the distance between reflectors 65—66. In the example shown in Fig. 9, the distance between reflector pair 63—64 is exactly two-thirds of the distance between reflector pair 65—66.

The reflectors may be provided one over the other, but in practice it is often more suitable to mount the reflector pairs at the same level as indicated in the drawing.

The connection lines between two reflectors in each pair are parallel to each other as well as to an indicated bearing line 67 in which a vessel 68 is assumed to be situated.

Further, the distance between the two connection lines should be so small that no dissolution of the virtual images will take place. The distance, however, should be so great that no cross-reflection takes place such as reflection in the following sequence: 68—63—64—65—68—

If these conditions are satisfied, the vessel at 68 will see a pattern created as follows:

The reflectors 63 and 64 will create a band of dots containing the dot 69 indicated by direct reflection and thereafter the dots 70—78. The reflectors 65 and 66 simultaneously create an amplification of dot 69, a free dot 70, an amplification of the dot 72, a free dot 80, an amplification of the dot 75, a free dot 81, an amplification of the dot 78 and so on. The vessel at 68 will therefore see in its radar scope a code band of dots containing alternatively one bright dot, for example, 69, 72, 75 and 78, and three intermediate dots of lesser brilliance indicated, for example, by the group 70, 79 and 71, or the group 73, 80 and 74, or the group 76, 81 and 77.

The field allowed for navigation is in the present case limited by the connection lines between the reflectors 63 and 66 and the reflectors 64 and 65, which form the angles $\alpha$ and $\beta$ respectively with the bearing line 67. The limitation lines in the drawing are indicated by 82 and 83 respectively. These limitation lines are intended to limit the navigation range with respect to a couple of shallows 84 and 85 present in the navigational water.

If a vessel should get as far as the limitation line 82 as shown by vessel 86, its radar beam will be reflected by the reflectors 63 and 66 without any cross reflection with the reflectors 64 and 65. The consequence of this reflection will be a simple band of dots 69, 87 and 88 to 92 with equal distances between the dots. The presence on the radar scope of such evenly spaced dots will warn the pilot that he should steer closer to the allowed navigational angle.

If the pilot should approach the other limitation line 83 as indicated by vessel 93, he will also see evenly spaced dots 69, 94 to 101. The distance between the dots is different in the two limitation lines 82 and 83 so that the pilot can identify the particular limitation line he is on and can thereby determine whether to yaw port or starboard.

The drawing has been exaggerated in its scale in order to present a clear picture. In practice, however, the angles $\alpha$ and $\beta$ should be limited to the order of magnitude of 1° to 5°. If the angles are in this range, a vessel in the intermediate zone between bearing line 67 and lines 82 or 83 will obtain some cross reflections on the radar scope. Thus, the vessel will in its scope see a band of all the dots which are spaced a distance equal to the distance between the reflectors 63 and 64 on one side and the reflector 65 and 66 on the other side, as is also evident from Fig. 9.

Figure 10:
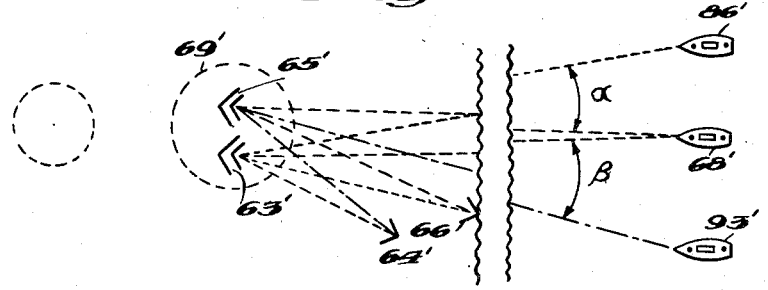

It is possible to modify this system of Fig. 9 by the use of side reflectors in a manner which has already been described in connection with Fig. 6. Fig. 10 shows such a modification of the system of Fig. 9 in which the different reflectors are provided with the same reference numerals as in Fig. 9 with the addition of a prime. It should be evident from the description of Fig. 9 how this system according to Fig. 10 functions in general.

In Fig. 10, the side reflectors are both disposed on the same side of the allowed navigational angle. The system would not be changed in any major respect if the reflectors 64 and 66 were located each on one side of the allowed navigational channel. Such a modified system is shown in Fig. 11, the same reference numerals being used with double primes being added.

Figure 11:
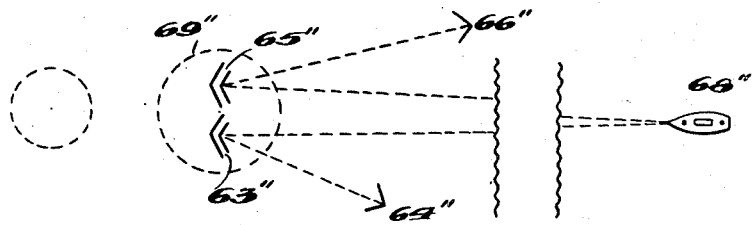

The systems according to Figs. 10 and 11 have an advantage over the system according to Fig. 9. In order to provide a code, which is the function of these systems, it is necessary that the distance between reflector pairs be in a fixed relationship, such as 2:3 as in the chosen example. In the system of Fig. 10, the fixed relation between the distances between pairs influences the magnitude of the angles $\alpha$ and $\beta$. As long as these angles are small, one may assume with good approximation that the angles also have the relationship to each other of 2:3.

However, it would be advantageous if the navigation space was equally great on each side of the given bearing line. This may be obtained by adjustment of the reflector angles for the wide angle reflectors of the systems of Figs. 10 and 11.

Figure 12:
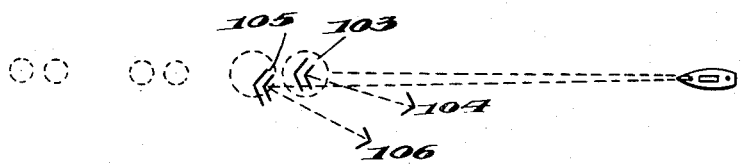

A code-like grouping of virtual images similar to those discussed in connection with Figs. 9 to 11 can also be obtained with the system of Fig. 12. In this system, there are two complete groups of reflectors of the type shown in Fig. 6. These are spaced a comparatively short distance from each other in the direction of the input beam. It is immediately apparent from the drawing that the signals will be repeated with a distance which is determined by the distance between the reflectors 103 and 104 or between the reflectors 105 and 106. The radar scope will show double dots, the spacing of the double dots being determined by the distance between the reflectors 103 and 105.

Other combinations of the above described reflector groupings will become apparent to those skilled in the art so that it will be seen how further code signals can be arranged for navigational purposes.

In a general manner, while there has been disclosed in the above description, what is deemed to be the most efficient and practical embodiment of my invention, it should be well understood that the invention is not limited to such embodiment as there might be changes made in the arrangement, disposition and form of the parts without departing from the principle of the present invention as comprehended within the scope of the accompanying claims.

I claim:

1. A reflector system intended for radar purposes, comprising, a first aggregate of reflectors including a first reflector for receiving a signal beam and reflecting a first portion of said beam back to its transmitter, a second reflector for receiving a second portion of said beam from said first reflector, said reflectors having cooperating reflecting surfaces disposed in beam aligned relationship to cause diminishing portions of said second portion of said beam to be reflected back and forth, the remaining portions of said second portion being directed back to the transmitter, the second aggregate of reflectors like said first aggregate of reflectors and cooperating with said first aggregate to indicate a complicated radar picture, said first and second reflectors in said first aggregate being spaced a distance different from that between similar reflectors in said second aggregate to provide for different lengths of the paths for repeated reflection in order to create a code-like grouping of indications.

2. A reflector system according to claim 1, in which the aggregates are placed so in relation to each other that within a given range no cross reflection between the aggregates will emanate whereas, however, when deviating to one or the other or both sides from this range there will be cross reflection, the code-like reflection grouping thereby being changed.

3. A reflector system according to claim 1, in which in each reflector aggregate said first reflector includes a wide angle reflector, and said second reflector is located at the side of said first reflector to cooperate with said wide angle reflector to cause said back and forth reflection of said diminishing portions.

No references cited.